Oct. 25, 1932.  W. F. DALZEN  1,885,085
ROCK DRILL
Filed Nov. 26, 1930   2 Sheets-Sheet 1
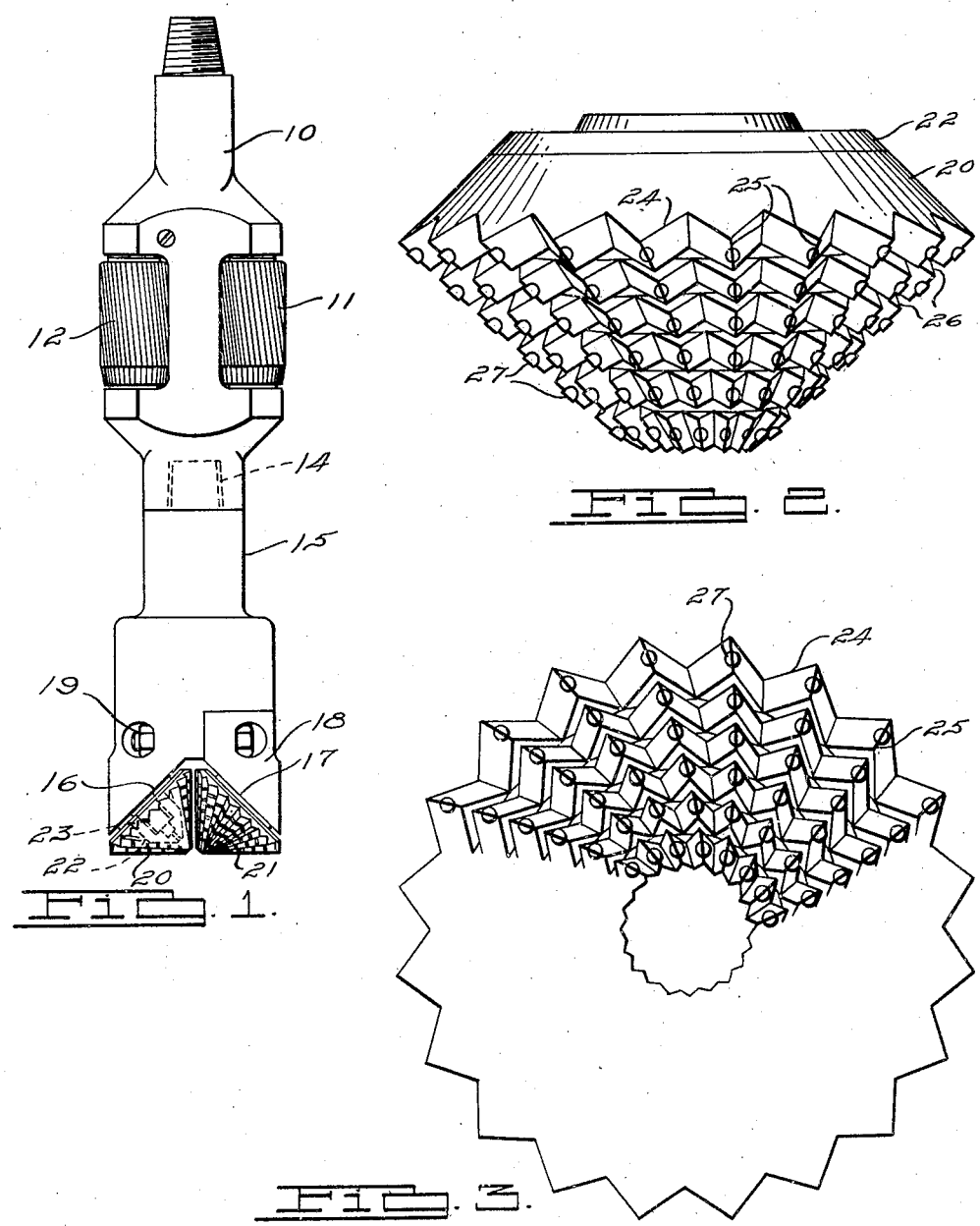
INVENTOR
William F. Dalzen
BY
ATTORNEYS.

Oct. 25, 1932.　　W. F. DALZEN　　1,885,085
ROCK DRILL
Filed Nov. 26, 1930　　2 Sheets-Sheet 2

INVENTOR
William F. Dalzen.
BY
ATTORNEYS.

Patented Oct. 25, 1932

1,885,085

UNITED STATES PATENT OFFICE

WILLIAM F. DALZEN, OF GROSSE POINTE PARK, MICHIGAN

ROCK DRILL

Application filed November 26, 1930. Serial No. 498,368.

This invention relates to improvements in rock drills, and more especially to improvements in the cutting or boring elements thereof, particularly the conical cutters of rock drill bits.

Heretofore the conical cutters arranged in pairs at the end of the bit, have been fluted in straight cuts along right lines of the conical surface, or, in other words, with the cuts coplanar with the axis of the cone. With the teeth in straight rows, co-planar with the axis of the cone, the full length of the cutting edges of each row of teeth, all along the face of the cone, are engaged at one time, and the driving pressure is accordingly distributed over a long edge.

The objects of the present invention are to provide a cutting cone in which the cutting action is more evenly distributed over the entire surface of the cone, and the pressure concentrated on shorter cutting edges than in conventional constructions, thus increasing the effective unit cutting pressure; and to provide a cutter in which there is a more effective breaking up of the material. Further objects are to provide cutting surfaces which will remain sharp for a longer period of operation; and to provide inserts of extremely hard material in the cutting edges of the drill teeth to effect this result.

Illustrative embodiments of my invention are shown in the accompanying drawings, in which,—

Fig. 1 is a side elevation of the rock drill.

Fig. 2 is an enlarged view of one of the cones shown in Fig. 1.

Fig. 3 is a bottom plan or face view of the cone shown in Fig. 2.

Figures 5, 6:
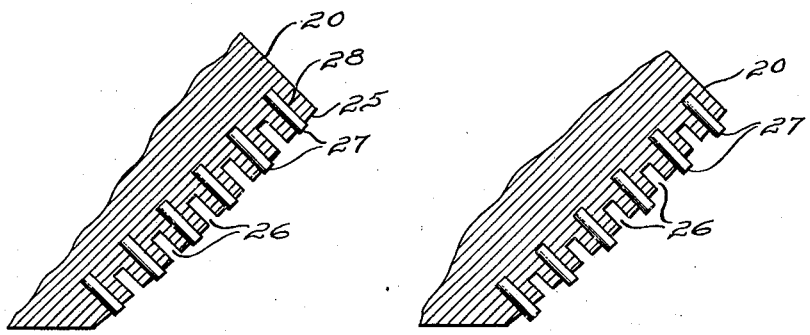
Fig. 5 is a fragmentary detail section through and along the cutting edge of the cone shown in Fig. 2.
Fig. 6 is a similar view showing the condition after considerable wear has taken place.

The bit shown has a body 10 or shank in the sides of which are rotatably mounted the longitudinally disposed cylindrical reamers 11 and 12. The lower end of the shank has a tapped hole to receive the threaded upper end 14 of the bit head 15 which is enlarged at the lower end and provided with inwardly sloping annular surfaces 16 and 17, the portion 18 having the surface 17 being removably connected to the main portion of the head by bolts 19 so that said portion 18 can be removed for inserting or replacing the cutting cones 20 and 21. The cones may be rotatably mounted on short arbors 22 which are threaded onto studs 23 secured in the head and projecting at right-angles from the angular surfaces 16 and 17.

In forming the teeth on the surface of the cone, in accordance with this invention, the valleys or grooved spaces 24 between the teeth are cut along helical lines, the grooving cutters being angular and set deeper at the outer edge of the cone than at the apexes. This forms the cutting edges or teeth 25 in helical rows, so that only one portion of any single row is cutting at any one time directly at the bottom of the hole. Also by this arrangement there is always a continuous evenly distributed cutting action occurring at the face of the bit; and the pressure is concentrated on short lengths of the cutting edges. By this arrangement it becomes feasible, although not necessary, to mount the cones so that the lower surfaces of the two cones are in a continuous straight line, normal to the axis of the drill, without having a low effective unit cutting pressure. For breaking up the lengths of the teeth, circular notching cuts 26 are made parallel to the base of the cone, in the usual manner.

For reinforcing the cutting edges 25 and providing surfaces having greater wear resisting qualities than the adjacent surfaces of the cutter, inserts 27 are provided consisting of cylindrical pegs of hard material which are driven into holes 28 along the cutting edges. The inserts are of an extremely hard material so that as the adjacent material wears away, the inserts resist the wear and are left projecting, as shown in Fig. 6, so that the wear is finally concentrated thereon and the edges remain sharp or effective for cutting for an extended period of use. The nature of the material from which the inserts are made is usually such as to make it impractical for use as a material for the cutter in its entirety.

Figure 4:
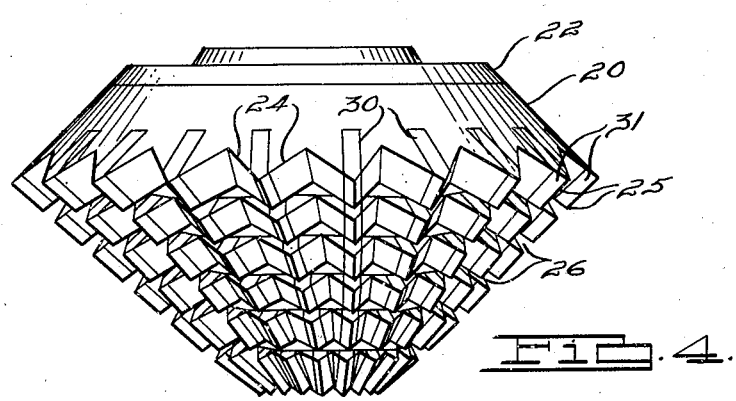
Fig. 4 is a side elevation of a modified form of the cone.
Figure 7:
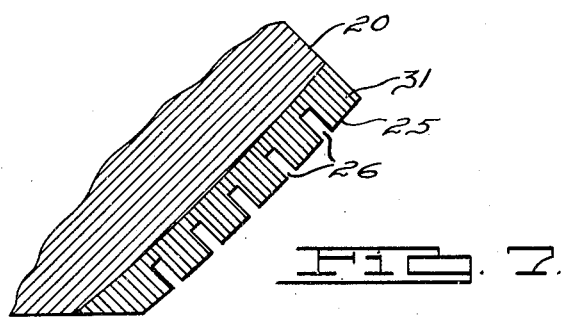
Fig. 7 is a fragmentary detail section through and along the cutting edge of the cone shown in Fig. 4.

In the modified form shown in Fig. 4, slots 30 are milled to remove the material at the cutting edge, and wear resisting bars 31 are inserted therein, the edges being notched by the circumferential cuts after the bars are inserted.

I claim:

1. For a rock drill, a cone cutter having spirally curved rows of teeth formed thereon and inserts of relatively harder material embedded in the teeth along their cutting edges.

2. For a rock drill, a cutting cone having longitudinal spirally curved cutting teeth formed thereon, the cutting teeth being reinforced by insertions of relatively harder material forming longitudinally extending cutting edges.

3. For a rock drill, a cone cutter having longitudinal spirally curved rows of cutting teeth thereon, said rows being longitudinally slotted, and inserts of relatively harder material secured therein for cutting normal to their longitudinal dimensions.

4. For a rock drill, a cone cutter having longitudinal spirally curved rows of cutting teeth thereon, said rows being longitudinally slotted, and notched inserts of relatively harder material secured therein to form cutting edges along their longitudinal dimensions.

WILLIAM F. DALZEN.